United States Patent
Zhang et al.

(10) Patent No.: US 11,525,697 B2
(45) Date of Patent: Dec. 13, 2022

(54) LIMITED-SENSOR 3D LOCALIZATION SYSTEM FOR MOBILE VEHICLE

(71) Applicant: Near Earth Autonomy, Inc., Pittsburgh, PA (US)

(72) Inventors: Ji Zhang, Pittsburgh, PA (US); Sanjiv Singh, Pittsburgh, PA (US)

(73) Assignee: Near Earth Autonomy, Inc., Pittsburgh, PA (US)

( * ) Notice: Subject to any disclaimer, the term of this patent is extended or adjusted under 35 U.S.C. 154(b) by 107 days.

(21) Appl. No.: 17/141,580

(22) Filed: Jan. 5, 2021

(65) Prior Publication Data
US 2021/0215504 A1 Jul. 15, 2021

Related U.S. Application Data

(60) Provisional application No. 62/960,360, filed on Jan. 13, 2020.

(51) Int. Cl.
*G01C 21/00* (2006.01)
*B60W 60/00* (2020.01)
(Continued)

(52) U.S. Cl.
CPC ....... *G01C 21/3815* (2020.08); *B60W 60/001* (2020.02); *B62D 15/021* (2013.01); *G01C 21/387* (2020.08); *G06K 9/6232* (2013.01); *G06V 20/58* (2022.01); *G07C 5/008* (2013.01); *B60W 2420/52* (2013.01)

(58) Field of Classification Search
None
See application file for complete search history.

(56) References Cited

U.S. PATENT DOCUMENTS

| 2010/0106356 A1* | 4/2010 | Trepagnier | G05D 1/024 701/25 |
| 2016/0076892 A1* | 3/2016 | Zhou | G05D 1/102 701/3 |

(Continued)

FOREIGN PATENT DOCUMENTS

| CN | 110068335 A * | 7/2019 | G01C 21/165 |

OTHER PUBLICATIONS

Machine translation of CN-110068335-A (Year: 2019).*

*Primary Examiner* — Anne Marie Antonucci
*Assistant Examiner* — Kyle S Park
(74) *Attorney, Agent, or Firm* — K&L Gates LLP

(57) ABSTRACT

A system configured to autonomously operate a vehicle within an environment is disclosed herein. The system includes a vehicle including a sensing system with a single active sensor configured to detect objects within an environment as the vehicle travels on a journey along a travel path within the environment. The system further includes a computing system communicably coupled to the vehicle. The computing system includes a memory configured to store a three-dimensional map of the environment, and a processor configured to determine an updated pose of the vehicle based on the three-dimensional map and input from the single active sensor of the vehicle. The processor is further configured to generate an updated travel path for the vehicle, wherein the updated travel path is generated based on the updated pose of the vehicle within the environment determined by the computing system.

15 Claims, 3 Drawing Sheets

(51) Int. Cl.
*G07C 5/00* (2006.01)
*B62D 15/02* (2006.01)
*G06K 9/00* (2022.01)
*G06K 9/62* (2022.01)
*G06V 20/58* (2022.01)

(56) References Cited

U.S. PATENT DOCUMENTS

2020/0333466 A1* 10/2020 Hansen .................. G01S 17/08
2020/0408887 A1* 12/2020 Zeng .................... G01S 7/4808
2021/0082291 A1* 3/2021 Villa .................... G08G 5/0043

* cited by examiner

LIMITED-SENSOR 3D LOCALIZATION SYSTEM FOR MOBILE VEHICLE

PRIORITY CLAIM

The present application claims priority to U.S. provisional patent application Ser. No. 62/960,360, filed Jan. 13, 2020, which is incorporated herein by reference.

BACKGROUND

An autonomous vehicle typically needs to determine its position and orientation ("pose") in a multi-dimensional coordinate system for navigation purposes. In order to achieve such "3D localization," autonomous vehicles often carry many sensor systems, such as radar, lidar, sonar, GPS, odometers, and inertial measurement units. These systems can be too expensive, too large and/or too heavy in certain applications.

SUMMARY

In one general aspect, the present invention is directed to a system configured to autonomously operate a vehicle within an environment. The system can include a vehicle including a sensing system with a single active sensor configured to detect objects within an environment as the vehicle travels on a journey along a travel path within the environment. For example, the vehicle, can include any air-based, ground-based, or sea-faring vehicle. The system can further include a computing system communicably coupled to the vehicle. The computing system can include a memory configured to store a three-dimensional map of the environment, and a processor configured to determine an updated pose of the vehicle based on the three-dimensional map and input from the single active sensor of the vehicle. The processor can be further configured to generate an updated travel path for the vehicle, wherein the updated travel path is generated based on the updated pose of the vehicle within the environment determined by the computing system.

In another general aspect, the present invention is directed to a system configured to autonomously operate a vehicle within an environment. The system can include a sensing system with a single active sensor configured to detect objects within an environment as a vehicle travels on a journey along a travel path within the environment. The system can further include a computing system communicably coupled to the single active sensor. The computing system can include a memory configured to store a three-dimensional map of the environment, wherein the three-dimensional map is created prior to the journey. The computing system can further include a processor configured to determine, on an on-going basis as the vehicle travels within the environment, an updated pose of the vehicle within the environment based, at least in part, on the three-dimensional map and input from the single active sensor of the vehicle. The processor can be further configured to generate, as the vehicle travels within the environment, an updated travel path for the vehicle, wherein the updated travel path is generated based, at least in part, on the updated pose of the vehicle within the environment determined by the computing system.

In another general aspect, the present invention is directed to a method of autonomously operating a vehicle within an environment. Prior to a journey of the vehicle within the environment, the method includes storing a three-dimensional map of the environment. While on the journey, the method can include determining, on an on-going basis as the vehicle travels within the environment, an updated pose of the vehicle within the environment based, at least in part, on the three-dimensional map and input from a sensing system of the vehicle, and generating, as the vehicle travels within the environment, an updated travel path for the vehicle, wherein the updated travel path is generated based, at least in part, on the updated pose of the vehicle within the environment.

FIGURES

Various aspects of the present invention are described herein by way of example in connection with the following figures, wherein.

DESCRIPTION

Figure 1:
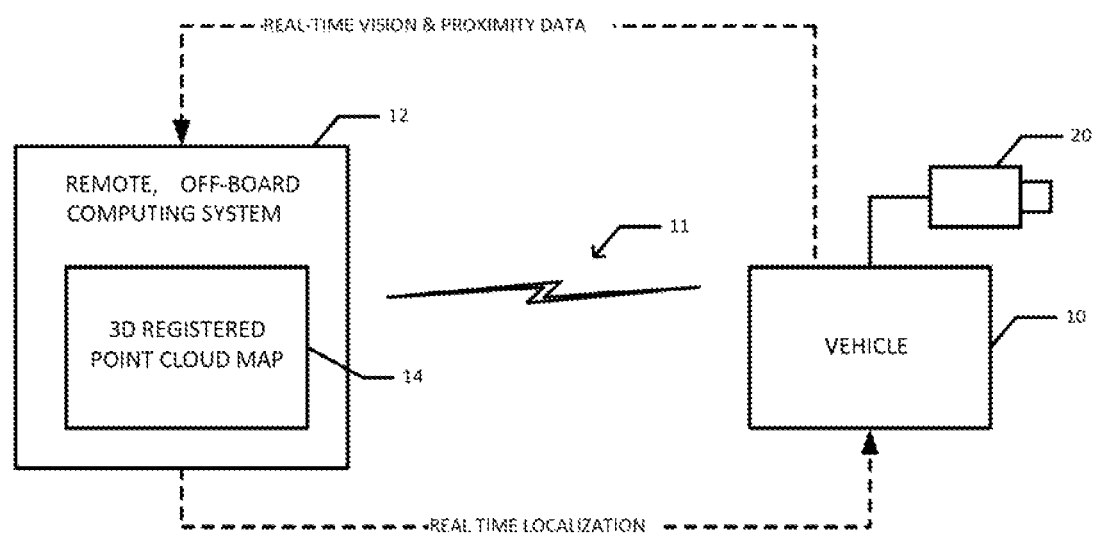
FIG. 1 is a block diagram of a vehicle with limited on-board sensing in communication with a remote, off-board computing system that stores an a priori 3D map according to various aspects of the present invention.

FIG. 1 is a block diagram of a vehicle 10 with limited on-board sensing in communication with a remote, off-board computing system 12 according to various aspects of the present invention. The off-board computing system 12 may store an a priori 3D map 14 of the environment in which the vehicle 10 is to travel. The a priori 3D map 14 may include a 3D-registered point cloud of the environment, where the point cloud data is collected from, for example, a lidar system prior to travel by the vehicle in the environment. The vehicle 10 may be any suitable type of mobile ground or aerial vehicle, such as a car, a motorcycle, a ground-based mobile robot, a rotor or fixed-wing aircraft, such as a drone, unmanned aerial vehicle, etc. As such, the vehicle 10 includes steering and propulsion systems. For example, the steering/propulsion system for a gas-powered ground vehicle may include a gas-powered engine and the drivetrain. The steering/propulsion system for an electric vehicle may include a battery, an electric motor and the drivetrain. The steering/propulsion system for a rotorcraft (e.g., a drone or other type rotorcraft) can include the rotorcraft's motor-powered rotor(s). The steering/propulsion system for a fixed-wing aircraft can include the engine(s) along with ailerons, elevators, rudders, spoilers, and/or air brakes for steering, for example.

The vehicle 10 and the off-board computing system 12 are in communication via a wireless data link 11, such as an infrastructure or ad hoc WiFi network, a cellular network, etc.

The vehicle 10 may include limited sensors in comparison to typical autonomous navigation vehicles. For example, according to some non-limiting aspects, the vehicle 10 can include a single active sensor. As used herein, the expression "single active sensor" shall be construed to include a single sensor that is activated as the vehicle 10 traverses through an environment. The systems and methods disclosed herein are capable of utilizing information about the environment as generated by a single active sensor to autonomously operate the vehicle. According to the non-limiting aspect of FIG. 1, the vehicle can include a single active sensor such as a single, forward-facing camera 20, which faces (and captures image from) the direction that the vehicle 10 moves. In operation, the vehicle 10 may transmit to the off-board computing system 12 via the wireless data network 11 real-time, time-stamped vision data collected by the camera 20. In turn, the off-board computing system 12 extracts features (e.g., corners) from the image data from the camera 20 and matches the extracted features from the image data to features in the a priori 3D map 14. The features in the a priori 3D map 14 are registered to 3D positions, so that when extracted features from the image data are matched to features in a priori 3D map 14, the pose of the vehicle 10 relative to the detected features can be determined.

The a priori 3D map 14 of the environment in which the vehicle 10 is to travel can be collected by a mapping device that includes, for example, a scanning lidar unit and a camera. The mapping device also includes sensors (e.g., GPS sensors, IMU, etc.) for determining a pose of the mapping device, in particular the pose of the camera thereof. The mapping device collects the lidar data and registers the lidar points to a 3D-registered point cloud. As the mapping device collects the lidar data, the mapping device also computes and updates the pose of the camera of the mapping device. Image features are linked to 3D points in the lidar point cloud by projecting the image features from the camera's known poses when the image with the feature was captured onto the point cloud. From there, a ray for each image feature can be projected to find the corresponding 3D point in the point cloud. An example of a suitable mapping device for generating the a priori 3D map 14 is the Topaz mapping sensor from Near Earth Autonomy, although other suitable mapping devices could be used.

Figure 2:
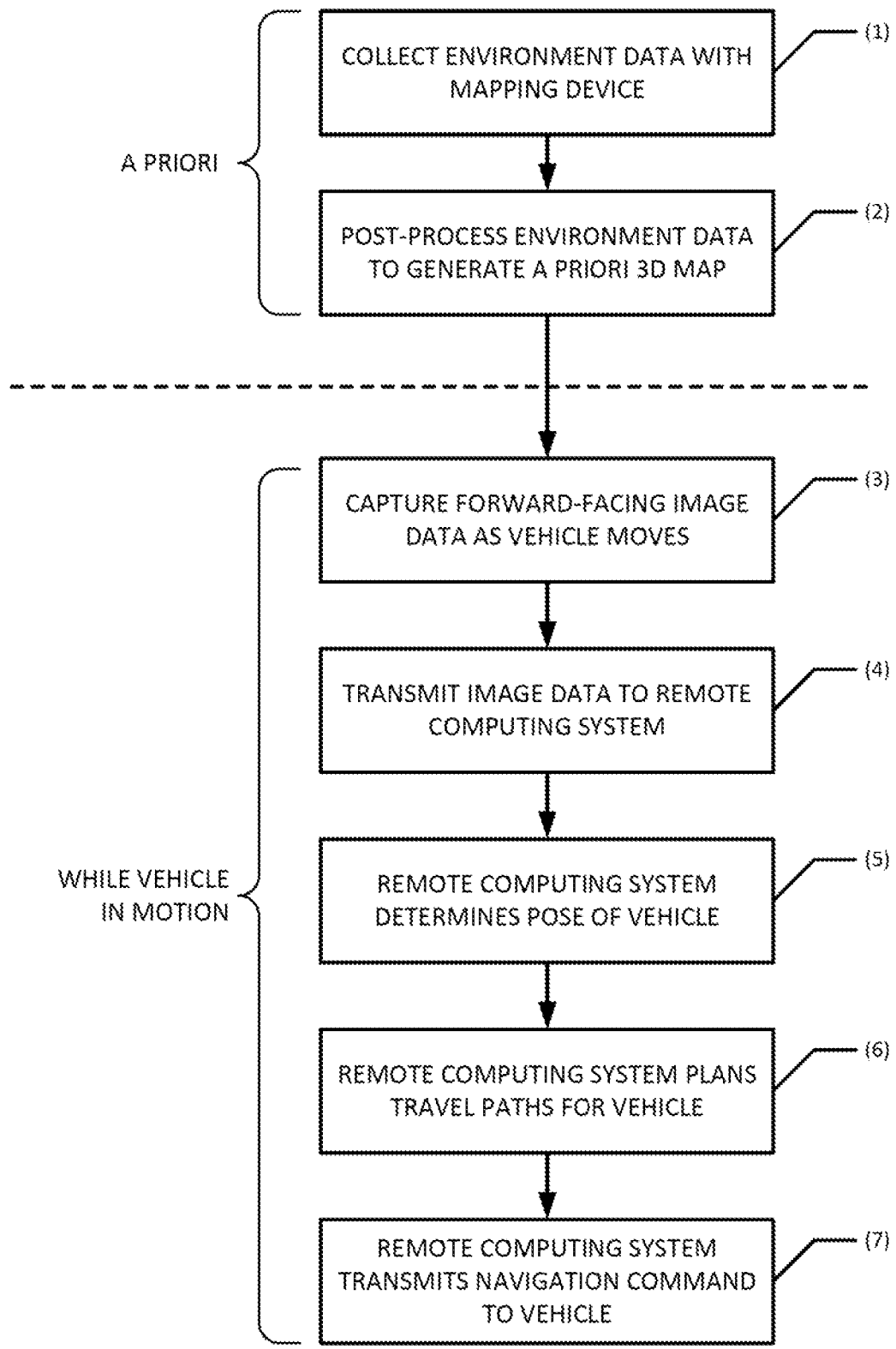
FIG. 2 is a flowchart of a process performed by the system of FIG. 1 according to various aspects of the present invention.

In operation, in one aspect, as shown in the flowchart of FIG. 2, at step (1), data (e.g., lidar scan data and image data) for the environment that the vehicle 10 is to travel in are collected so that, at step (2), the collected data can be post-processed to generate the a priori map 14. The post-processing of the data can include extracting features (e.g., corners) of objects from the image data collected by the mapping device and matching the extracted features to the 3D-lidar point cloud to register the extracted features to 3D coordinates.

After the map 14 is created, the pose of the vehicle 10 can be determined using the map 14 as the vehicle 10 moves in the mapped environment. At step (3), the camera 20 of the vehicle 10 captures image data from in front of the vehicle 10 as the vehicle 10 moves within the environment mapped by the mapping device at step (1). At step (4), the image data are transmitted back to the remote computing system 12, which, at step (5), determines the pose of the vehicle based on the image data transmitted by the vehicle 10 at step (4) and based on the a priori map 14 created at step (2). As explained above, the remote computing system 12 can extract features (e.g., corners) in the image data transmitted from the vehicle at step (4). Then, the remote computing system 12 can match the extracted features to features in 3D map created at step (2). Based on the location of the features in the map, the remote computing system 12 can then determine the pose of the vehicle 10.

Once the pose of the vehicle 10 is determined at step (5), the vehicle pose can be used for an intended purpose. For example, where the pose of the vehicle 10 is needed to plan a travel path for the vehicle 10 (e.g., "motion planning"), such as where the vehicle 10 is an autonomous vehicle, at step (6) the remote computing system can plan possible travel paths for the vehicle 10. Then, based on the computed possible travel paths, navigation control commands could be transmitted via the wireless link 11 at step (7) from the remote computing system 12 to the vehicle 10, so that the vehicle 10 can navigate the environment. The navigation control commands can include commands for the steering, propulsion and/or braking systems of the vehicle 10.

Steps (1) and (2) are performed a priori, e.g., before use of the 3D map 14 by the vehicle 10. On the other hand, steps (3)-(7) are performed essentially in real time as the vehicle travels within the environment. There will be a time lag between the image data captured by the vehicle's camera at step (3) and the determination of vehicle pose at step (5). For example, if the time-stamp for the image captured at step (3) and transmitted at step (4) is at time T0, then at step (5) the remote computing system computes the pose for the vehicle at time T0. By the time the navigation command is transmitted at step (7), the vehicle is likely to have a different pose than at time T0. The remote computing device 12 can factor in the expected change in the vehicle pose over the time lag when computing the travel paths at step (6) and determining the navigation command at step (7).

In the aforementioned aspects, there was a wireless data link 11 between the vehicle 10 and the remote, off-board computing system 12. In other aspects, the vehicle 10 and the remote, off-board computing system 12 could be tethered by a wired data link, such as an Ethernet cable or other suitable wired communication link. As such, the wired link may transmit the image data from the vehicle's camera 20 to the remote computing system 12, and also transmit the real-time localization data (and possibly other information, such as navigation control commands) from the remote computing system 12 to the vehicle 10.

Figure 3:
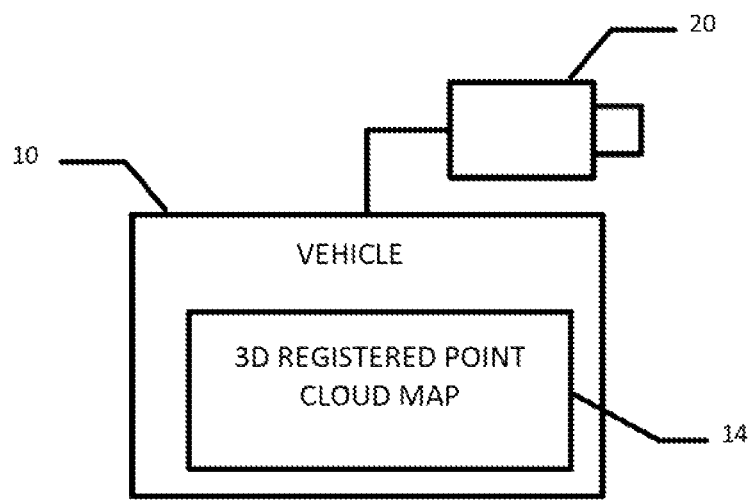
FIG. 3 is a block diagram of a vehicle with limited on-board sensing and with an on-board computing system that stores an a priori 3D map according to various aspects of the present invention.

In yet other aspects, the vehicle 10 could have on-board processing capability. For instance, in the example of FIG. 3, the a priori 3D map 14 could be loaded into an on-board memory of the vehicle 10. As such, as the camera 20 captures the image, an on-board processor of the vehicle 10 could compute the pose of the vehicle 10 based on the image data, as well as the 3D map 14. Then, the vehicle's on-board processor could plan the travel paths for the vehicle and generate navigation commands. In yet other aspects, the processing capability could be distributed between the remote computing system 12 and the vehicle 10. For example, the remote computing system in one embedment could store the 3D map and compute the vehicle pose, but then transmit the vehicle pose to the vehicle so that the vehicle's on-board processor can determine the travel paths and navigation commands. In yet another aspect, the remote computing system 12 can transmit the possible travel paths to the vehicle, and the vehicle determines the navigation control commands.

One benefit of the above-described system is that the vehicle 10 can navigate the pre-mapped environment with a limited number of on-board sensors, such as the single forward-facing camera 20. Another benefit of the above-described system is that the vehicle 10 can navigate the environment even when the vehicle 10 does not travel the exact same travel path as the mapping device used at step (1) of FIG. 2 to generate the a priori map 14 of the environment. That is, as long as the vehicle travels within the area mapped by the mapping device, the above-described process can be used to navigate the vehicle, without restricting the vehicle to the exact same travel path used by the mapping device to collect the map data at step (1).

The vehicle 10 preferably includes at least an on-board processor(s) and computer memory (e.g., RAM, ROM, flash, etc.). In an aspect such as FIG. 1 where the vehicle 10 transmits the sensor data to the remote computing system 12, the vehicle 10 also includes a radio communication circuit (e.g., a WiFi communication circuit) for transmitting the camera data to, and receiving data from, the remote computing system 12 via the data link 11. The on-board processor can also include a controller for controlling the steering, propulsion and/or braking systems of the vehicle 10 based on the navigation control commands. In an aspect such as FIG. 3, the vehicle's on-board processor is programmed to determine the pose of the vehicle 10 based on the camera data using the on-board a priori 3D map 14. The vehicle's on-board processor may also be programmed to generate the possible travel paths and to generate the navigation control commands. The vehicle's on-board memory stores the software that is executed by the vehicle's on-board processor. And in the aspect of FIG. 3, the vehicle's on-board memory stores the a priori 3D map 14.

The above description focused on motion planning and/or navigation for the vehicle 10, although the above-described system could be used for other applications. For example, the vehicle 10 could be used for aerial or ground-based inspection and/or mapping. For example, the location of a defect (e.g. a crack) in an object in the environment can be ascertained by determining the pose of the vehicle 10 when the defect was sensed, which pose can be determined based on the a priori map 14 as described herein. The defect could be detected by the camera 20 or by another sensor system of the vehicle 10 that is not used for pose determination. Similarly, the vehicle 10 may include another sensor for mapping the environment (e.g., a ground cover sensor), with the resulting map being generated based on the time-stamped poses of the vehicle as the map data is collected, with the time-stamped vehicle poses being determine from the a priori map 14 as described herein.

The vehicle 10 and the remote computing system 12 may include one or more processors (e.g., CPUs or GPUs), primary data storage or memory (i.e., memory that is directly accessible to the CPUs/GPUs, such as RAM, ROM, registers, cache memory), secondary data storage (i.e., data storage that is not directly accessible by the CPUs/GPUs, such as HDDs, flash, SSDs, etc.). The remote computing system 12 may also include nearline and/or off-line storage. The processor(s) of the vehicle 10 and the remote computing system 12 may be programmed to perform the functions described herein with software that is stored in the primary, secondary, nearline and/or off-line data storage, as the case may be, and executed by the processor(s) of the vehicle 10 and/or the remote computing system 12. The computer software may be implemented using any suitable computer programming language such as .NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at run time by an interpreter.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various aspects have been described herein, it should be apparent that various modifications, alterations, and adaptations to those aspects may occur to persons skilled in the art with attainment of at least some of the advantages. The disclosed aspects are therefore intended to include all such modifications, alterations, and adaptations without departing from the scope of the aspects as set forth herein.

Various aspects of the subject matter described herein are set out in the following aspects, implementations, and/or examples, which can be interchangeably combined together in various combinations:

Example 1. A system comprising a vehicle comprising a sensing system consisting of a single active sensor configured to detect objects within an environment as the vehicle travels on a journey along a travel path within the environment; and a computing system communicably coupled to the single active sensor, wherein the computing system includes: a memory configured to store a three-dimensional map of the environment, wherein the three-dimensional map is created prior to the journey; and a processor configured to: determine, on an on-going basis as the vehicle travels within the environment, an updated pose of the vehicle within the environment based, at least in part, on the three-dimensional map and input from the single active sensor of the vehicle; and generate, as the vehicle travels within the environment, an updated travel path for the vehicle, wherein the updated travel path is generated based, at least in part, on the updated pose of the vehicle within the environment determined by the computing system.

Example 2. The system of Example 1, wherein the processor is positioned on-board the vehicle.

Example 3. The system of any one of Examples 1-2, wherein the processor is off-board relative to the vehicle.

Example 4. The system of any one of Examples 1-3, wherein the vehicle further includes a steering system and a propulsion system, and wherein the steering system and the propulsion system are configured to move the vehicle in response to the updated travel path.

Example 5. The system of any one of Examples 1-4, further comprising a mapping system configured to collect data about the environment, and wherein the three-dimensional map is generated from the data about the environment collected by the mapping system.

Example 6. The system of any one of Examples 1-5, wherein the mapping system includes a lidar system; and the three-dimensional map includes a point cloud based on the data about the environment collected by the lidar system.

Example 7. The system of any one of Examples 1-6, wherein the single active sensor includes a camera.

Example 8. The system of any one of Examples 1-7, wherein the camera is positioned such that the camera faces a direction of forward movement of the vehicle.

Example 9. The system of any one of Examples 1-8, wherein the input includes image data captured by the camera, and wherein the processor is configured to determine the update pose of the vehicle by: detecting an object in the environment based, at least in part, on the image data; extracting a feature of the detected object, comparing the extracted feature to a feature in the three-dimensional map; and registering the extracted feature to a three-dimensional coordinate in the environment.

Example 10. The system of any one of Examples 1-9, wherein the vehicle includes an aerial vehicle.

Example 11. The system of any one of Examples 1-10, wherein the vehicle includes a land vehicle.

Example 12. A system comprising a sensing system consisting of a single active sensor configured to detect objects within an environment as a vehicle travels on a journey along a travel path within the environment; and a computing system communicably coupled to the single active sensor, wherein the computing system includes: a memory configured to store a three-dimensional map of the environment, wherein the three-dimensional map is created prior to the journey; and a processor configured to: determine, on an on-going basis as the vehicle travels within the environment, an updated pose of the vehicle within the environment based, at least in part, on the three-dimensional map and input from the single active sensor of the vehicle; and generate, as the vehicle travels within the environment, an updated travel path for the vehicle, wherein the updated travel path is generated based, at least in part, on the updated pose of the vehicle within the environment determined by the computing system.

Example 13. The system of Example 12, wherein the processor is coupled to the vehicle.

Example 14. The system of any one of Examples 12-13, wherein the processor is remotely located relative to the vehicle.

Example 15. The system of any one of Examples 12-14, further comprising a mapping system configured to collect data about the environment, and wherein the three-dimensional map is generated from the data about the environment collected by the mapping system.

Example 16. The system of any one of Examples 12-15, wherein the mapping system includes a lidar system; and the three-dimensional map includes a point cloud based on the data about the environment collected by the lidar system.

Example 17. The system of any one of Examples 12-16, wherein the input includes image data, and wherein the processor is configured to determine the update pose of the vehicle by: detecting an object in the environment based, at least in part, on the image data; extracting a feature of the detected object, comparing the extracted feature to a feature in the three-dimensional map; and registering the extracted feature of the detected object to a three-dimensional coordinate in the environment.

Example 18. A method comprising: prior to a journey of a vehicle within an environment, storing a three-dimensional map of the environment; and while on the journey: determining, on an on-going basis as the vehicle travels within the environment, an updated pose of the vehicle within the environment based, at least in part, on the three-dimensional map and input from a sensing system of the vehicle, wherein the sensing system consists of a single active sensor; and generating, as the vehicle travels within the environment, an updated travel path for the vehicle, wherein the updated travel path is generated based, at least in part, on the updated pose of the vehicle within the environment.

Example 19. The method of Example 18, further comprising: collecting data about the environment via a mapping system prior to the journey; and generating the three-dimensional map based on the data about the environment collected by the mapping system.

Example 20. The method of any one of Examples 12-15, wherein the input includes image data captured by the single active sensor, and wherein determining the updated pose of the vehicle within the environment includes: extracting a feature of the detected object from the image data; comparing the extracted feature to the environmental data of the three-dimensional map; and registering the extracted feature of the detected object to three-dimensional coordinate in the environment.

What is claimed is:

1. A system comprising:
an aerial vehicle comprising:
a single forward-facing camera that captures images of an environment as the vehicle travels on a journey along a travel path within the environment, wherein the single forward-facing camera is the only navigational sensor of the aerial vehicle;
a steering system; and
a propulsion system; and
a computing system communicably coupled to the single forward-facing camera, wherein the computing system comprises:
a memory configured to store a three-dimensional map of the environment, wherein the three-dimensional map is created prior to the journey; and
a processor configured to:
determine, on an on-going basis as the aerial vehicle travels within the environment, an updated position and orientation ("pose") of the aerial vehicle within the environment based, at least in part, on a comparison of the images captured by the single forward-facing camera to the three-dimensional map; and
generate, as the aerial vehicle travels within the environment, an updated travel path for the aerial vehicle, wherein the updated travel path is generated based, at least in part, on the updated pose of the aerial vehicle within the environment determined by the computing system,
wherein the steering system and the propulsion system are configured to navigate the aerial vehicle in response to the updated travel path.

2. The system of claim 1, wherein the processor is positioned on-board the aerial vehicle.

3. The system of claim 1, wherein the processor is off-board relative to the aerial vehicle.

4. The system of claim 1, further comprising a mapping system configured to collect data about the environment, and wherein the three-dimensional map is generated from the data about the environment collected by the mapping system.

5. The system of claim 4, wherein:
the mapping system comprises a lidar system; and
the three-dimensional map comprises a point cloud based on the data about the environment collected by the lidar system.

6. The system of claim 1, wherein the forward-facing camera is positioned such that the forward-facing camera faces a direction of forward movement of the aerial vehicle.

7. The system of claim 1, wherein the processor is configured to determine the updated pose of the aerial vehicle by:
detecting an object in the environment based, at least in part, on the images captured by the forward-facing camera;
extracting a feature of the detected object,
comparing the extracted feature to a feature in the three-dimensional map; and
registering the extracted feature of the detected object to a three-dimensional coordinate in the environment.

8. The system of claim 1, wherein the aerial vehicle comprises an unmanned aerial vehicle.

9. The system of claim 1, wherein the aerial vehicle comprises a drone.

10. A method comprising:
prior to a journey of an aerial vehicle within an environment, storing a three-dimensional map of the environment; and
while on the journey by the aerial vehicle after storing the three-dimensional map of the environment:
   capturing, on an on-going basis as the aerial vehicle travels with the environment, images of the environment with a single forward-facing camera of the aerial vehicle, wherein the single forward-facing camera is the only navigational sensor of the aerial vehicle;
   determining, on an on-going basis as the aerial vehicle travels within the environment, by a processor, an updated pose of the aerial vehicle within the environment based, at least in part, on a comparison of the images captured by the forward-facing camera to the three-dimensional map;
   generating, by the processor, as the aerial vehicle travels within the environment, an updated travel path for the aerial vehicle, wherein the updated travel path is generated based, at least in part, on the updated pose of the vehicle within the environment; and
   navigating along the updated travel path using a steering system and a propulsion system of the aerial vehicle.

11. The method of claim 10, wherein the processor is coupled to the aerial vehicle.

12. The method of claim 10, wherein the processor is remotely located relative to the aerial vehicle.

13. The method of claim 10, further comprising:
   collecting data about the environment via a mapping system prior to the journey; and
   generating the three-dimensional map based on the data about the environment collected by the mapping system.

14. The method of claim 13, wherein:
the mapping system comprises a lidar system; and
the three-dimensional map comprises a point cloud based on the data about the environment collected by the lidar system.

15. The method of claim 13, wherein determining the updated pose of the aerial vehicle within the environment comprises:
   detecting an object in the environment based, at least in part, on the images captured by the forward-facing camera;
   extracting a feature of the detected object;
   comparing the extracted feature to the environmental data of the three-dimensional map; and
   registering the extracted feature of the detected object to three-dimensional coordinate in the environment.

* * * * *